United States Patent
Luetke et al.

(10) Patent No.: US 9,522,442 B2
(45) Date of Patent: Dec. 20, 2016

(54) METHOD FOR THE CUTTING MACHINING OF WORKPIECES USING A LASER BEAM

(75) Inventors: Matthias Luetke, Dresden (DE);
Lothar Morgenthal, Dresden (DE);
Thomas Himmer, Dresden (DE);
Eckhard Beyer, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 1559 days.

(21) Appl. No.: 12/988,883

(22) PCT Filed: May 28, 2009

(86) PCT No.: PCT/DE2009/000773
§ 371 (c)(1),
(2), (4) Date: Jan. 4, 2011

(87) PCT Pub. No.: WO2009/143836
PCT Pub. Date: Dec. 3, 2009

(65) Prior Publication Data
US 2011/0155708 A1    Jun. 30, 2011

(30) Foreign Application Priority Data

May 29, 2008    (DE) .................. 10 2008 027 130

(51) Int. Cl.
*B23K 26/00* (2014.01)
*B23K 26/08* (2014.01)
*B23K 26/40* (2014.01)

(52) U.S. Cl.
CPC ......... *B23K 26/402* (2013.01); *B23K 2203/40* (2015.10); *B23K 2203/42* (2015.10)

(58) Field of Classification Search
CPC ............ B23K 26/00; B23K 26/0054–26/0063; B23K 26/0087; B23K 2203/30–2203/42; B23K 2203/00–2203/06; B23K 26/402

USPC .......................................... 219/121.6–121.82
See application file for complete search history.

(56) References Cited

U.S. PATENT DOCUMENTS

| | | | | |
|---|---|---|---|---|
| 4,865,873 A | * | 9/1989 | Cole et al. | ..................... 427/555 |
| 5,061,341 A | * | 10/1991 | Kildal et al. | ..................... 216/65 |
| 6,388,231 B1 | | 5/2002 | Andrews | |
| 6,627,844 B2 | * | 9/2003 | Liu et al. | ................. 219/121.71 |
| 6,696,667 B1 | | 2/2004 | Flanagan | |
| 7,763,179 B2 | * | 7/2010 | Levy et al. | ..................... 216/94 |
| 2007/0199927 A1 | * | 8/2007 | Gu et al. | .................. 219/121.69 |

FOREIGN PATENT DOCUMENTS

| | | |
|---|---|---|
| DE | 197 36 110 | 3/1999 |
| DE | 10 2004 040 068 | 4/2006 |
| JP | H4-502429 | 4/2010 |
| JP | H5-506408 | 4/2010 |
| WO | 92/05931 | 4/1992 |
| WO | 2007/088295 | 8/2007 |

OTHER PUBLICATIONS

Himmer et al., Exzellence Schnitte, Laser + Produktion Spezial, Publication des Fraunhofer IWS, Dresden und des Fraunhofer IOF, Jena, Muchen, 2008, pp. 18-19.

* cited by examiner

*Primary Examiner* — Sang Y Paik
(74) *Attorney, Agent, or Firm* — Fay Kaplun & Marcin, LLP

(57) ABSTRACT

A method is for cutting machining of a workpiece using a laser beam. The method includes (a) directing the focused laser beam onto a surface of the workpiece for a formation of a kerf; and (b) removing a material exclusively by ablation. The laser beam has a power density in a focal point of at least $1*10^7$ W/cm$^2$. The laser beam has a feed speed taking account of an absorption capability of the material to be removed of at least 150 m/min up to a maximum of 1200 m/min.

8 Claims, No Drawings

METHOD FOR THE CUTTING MACHINING OF WORKPIECES USING A LASER BEAM

FIELD OF INVENTION

The invention relates to a method for the cutting machining of workpieces using a laser beam. The method can be used with a workpiece formed from a homogeneous material, but also with workpieces formed as a composite component having a plurality of materials. So-called "kiss cutting" can particularly preferably be used with such composite components.

BACKGROUND INFORMATION

In many applications, high demands are also made on the quality in addition to high working productivity. This in particular relates to the formed cutting edges in the laser cutting processes in question. A narrow kerf is also desired. The processes using a cutting gas feed are disadvantageous under these aspects in which a melting of material is achieved using the energy of the laser radiation and the melt is then driven out using cutting gas driven into the kerf under elevated pressure even though they can be carried out highly productively with small machining times. With flexible workpieces such as foils, deformation can occur due to the influence of the cutting gas during machining. This can be compensated using the counteracting handling systems, with the machining speed, however, being reduced and in particular complex geometrical contours not being able to be formed or only being able to be formed very slowly.

In addition, processes are also known in which a material removal takes place by ablation and in this process material is removed from the workpiece to be machined by sublimation. These known techniques based on ablation, however, achieve low removal rates and can work with small feed speeds.

In the already addressed "kiss-cutting" individual sections of a material, which is attached to a carrier material, should be formed which can be removed from the carrier after the cutting machining. In this process, carriers based on cellulose such as paper or also polymers are frequently used as carriers. The different materials or substances can in this respect be connected with material continuity, preferably using suitable adhesive agents, so that the connection is also releasable again. Punching processes have previously been frequently used here. In this respect, however, the tools costs, the observation of minimum dimensions/minimum web thicknesses, the tool wear which occurs and difficulties in the machining of thin, foil-type workpieces are disadvantageous.

SUMMARY OF INVENTION

The present invention relates to improving the machining speed, the flexibility and the quality in the cutting machining of workpieces using a laser beam in which a material removal should be achieved exclusively by ablation.

DETAILED DESCRIPTION

In the method in accordance with the invention, a focused laser beam should be directed onto a surface of a workpiece to be machined with which the material removal should be achieved exclusively by ablation. A relative movement of laser beam and workpiece takes place using technical means known per se for the formation of desired cutting contours.

In this respect, the laser beam is preferably also deflected to increase the feed speed and to be able to react more flexibly to desired geometrical contours.

In the machining, a minimum power density at the focal point of the laser beam of $1*10^7$ W/cm$^2$, preferably at least $1*10^8$ W/cm$^2$ and a minimum feed speed of 150 m/min, preferably 200 m/min, very particularly preferably of at least 700 m/min must be observed as important parameters. Said minimum feed speed should, however, be less than 1200 m/min, preferably less than 1000 m/min. In this respect, the movement can take place so that the respective material to be removed can be taken into account. For this purpose, the respective absorption capacity of the material for the laser radiation used must be considered.

It also occurs due to the high feed speeds in machining that the material removal in the kerf is not sufficient in one pass to achieve a complete cutting/separation. This can, however, be countered by a cyclic passing through of the respective machining contour. For circular contours, for example, the total periphery can thus be moved over a multiple of times so that the same positions of the workpiece surface can be exposed successively to the influence of the laser radiation a multiple of times. A pulsed operation of the laser used is not necessary except for critical regions (corners, small radii) in which larger changes of the feed axis direction must be carried out and is even disadvantageous in many cases in the forming of a cutting contour or of a section. A switching off of the laser beam is only necessary on a change from cutting one contour to a contour to be formed subsequently and a reduction in the feed speed only in the named critical ranges.

Nor is any additional oscillating movement of the laser beam superimposed on the actual feed movement absolutely necessary. It can, however, be used in an assisting manner.

In the invention, the laser beam should preferably be worked with in the cw mode.

The use of a cutting gas in its sense can be completely dispensed with. Vapors which occur on the material removal can be countered by an extraction or also by the supply of a gas flow, with a gas flow with a considerably smaller gas pressure and gas volume flow being possible than is the case for cutting gas to achieve the effect of the avoidance of absorption by gases which have formed.

The laser beam should have a very tight focus and have a high beam quality. The focal point diameter should be smaller than 100 μm, preferably at about 25 μm, and the Raleigh length should be kept smaller than 500 μm. Fiber lasers, disc lasers, or other solid-state lasers can preferably be used in the invention.

The invention can particularly advantageously be used in kiss-cutting. Sections of a metal which absorbs the laser radiation and which is adhesively bonded to a paper web or a polymer foil web using a suitable adhesive agent can thus be cut out with preset contours, for example, and the individual sections can then be removed from the paper or polymer forming the carrier. In this process, only the metal is cut and is then vaporized in the region of the kerf. The carrier material is not affected, or is almost not affected, by the influence of the laser radiation. This is in particular not then the case when this material of the respective carrier is transparent for the laser radiation used or only absorbs it to a very low degree. Only the material at the surface of a composite workpiece to be machined in accordance with the invention in the region of the kerfs can therefore be removed for the contours to be formed, whereby the handling capability of the sections still connected to the carrier is improved, but a removal is easily possible.

Very narrow kerfs can be formed using the invention whose clearance can lie in the region of the size of the focal point diameter. The width of the kerf can, however, also be influenced by the respective feed speed with machining parameters otherwise kept constant.

Using the invention, a plurality of individual parts or sections, in this respect also of different geometrical designs, of a material to be cut held on a carrier, or workpieces designed in this manner can be obtained from a workpiece using the method after the cutting. It is possible to respond quickly to modifications and only the control program then has to be adapted. The material utilization is increased due to the narrow kerfs.

With a constant power density, the respective material removal (removed volume) can already be achieved simply by a change of the feed speed. An adaptation to the respective depth to be cut can also be achieved by the number of times the respective position of the material surface is exposed to the influence of the laser beam. In this respect, the respective absorption behavior of the workpiece material to be removed can also be taken into consideration. A higher material removal can thus be achieved with aluminum than on a removal of steel at a laser wavelength of 1070 nm.

It is also possible with the invention to remove any burr possibly formed at cutting edges in a workstep at the end of the machining, with the laser beam again traveling over the respective contour at the end of the machining. For this purpose, and also for other applications, a profiling of the laser beam intensity can take place such that higher intensities are present in the radially outer marginal region of the beam cross-section than in the inner one (top-head profile).

The invention should be explained in more detail by way of example in the following.

To form 100 circular sections having a diameter of 6.5 mm from a planar, smooth workpiece made of a steel with a thickness of 0.1 mm, a solid-state laser with a starting power of 1 kW was used which can be operated in cw mode. The laser radiation emitted by the laser had a wavelength of 1070 nm. A two-dimensionally effective 2D scan system which can be commercially obtained from the company SCANLAB was used for the deflection of the laser beam. The focal length f was kept at 160 mm. In this respect, a cross-section of the laser beam at the focal point of 707 $\mu m^2$ was achieved at a radius of 30 $\mu m$ and the power density there amounted to $1.56*10^8$ W/cm$^2$.

The feed speed was kept at 800 m/min so that 1.92 s was required for the formation of 100 of such circular sections. With a workpiece thickness of 0.05 mm, 1.17 s was required and with a workpiece thickness of 0.2 mm a time of 2.55 s was required.

However, a workpiece formed by a composite can also be machined in this manner instead of the purely metal workpiece. In this respect, a workpiece made of the steel as described above can have been connected with material continuity by means of an adhesive agent based on an acrylate on a flexible carrier of a polymer (e.g. PET). The polymer material is in this respect transparent for the wavelength of the laser radiation used.

After the machining, the sections were able to be removed as a result of the material removal achieved only by ablation so that these sections were able to be utilized as workpieces or as semi-finished products for a further processing. It is, however, also possible then to obtain a composite workpiece which is formed from the metal and the carrier which then have circular openings and which are still connected to one another with material continuity.

The invention claimed is:

1. A method for cutting machining of a workpiece using a laser beam, comprising:
    directing the focused laser beam onto a surface of the workpiece for a formation of a kerf; and
    removing a material exclusively by ablation,
    wherein the laser beam has a power density in a focal point of at least $1*10^7$ W/cm$^2$, the laser beam has a feed speed taking account of an absorption capability of the material to be removed of at least 150 m/min up to a maximum of 1200 m/min, the laser beam operating in a cw mode, the laser beam being directed a multiple of times to the same positions of the material surface for a successive material removal along a cutting contour to be formed.

2. The method of claim 1, wherein the laser beam is focused so that the focal point has a diameter less than 100 $\mu m$.

3. The method of claim 1, wherein the workpiece formed from at least two materials areally connected to one another is machined and in this respect only a material removal at the material present at the workpiece surface is carried out.

4. The method of claim 3, wherein sections are formed during the cutting, the sections being removed from the machined workpiece.

5. The method of claim 3, wherein the machining is carried out at the workpiece in which the at least two materials forming the workpiece are connected to one another with material continuity.

6. The method of claim 3, wherein the machining is carried out at a workpiece which has a material absorbing the respective laser radiation and a material not absorbing the laser radiation so that only the material absorbing the laser radiation is removed in the region of kerfs to be formed.

7. The method of claim 1, wherein a feed speed of at least 700 m/min is maintained.

8. The method of claim 1, wherein a profiling is set in the laser beam cross-section with higher intensities in an outer marginal region than in its interior.

* * * * *